INVENTOR.
HOWE H. HOPKINS
BY
ATTORNEYS

Nov. 12, 1957  H. H. HOPKINS  2,812,664
WABBLER TYPE INTERNAL COMBUSTION ENGINE
Filed Jan. 22, 1953  4 Sheets-Sheet 3

INVENTOR.
HOWE H. HOPKINS
BY
ATTORNEYS

United States Patent Office 2,812,664
Patented Nov. 12, 1957

2,812,664

WABBLER TYPE INTERNAL COMBUSTION ENGINE

Howe H. Hopkins, Chester, Pa., assignor to Samuel B. Eckert, Paoli, Pa.

Application January 22, 1953, Serial No. 332,599

13 Claims. (Cl. 74—60)

This invention relates to wabbler mechanisms for wabbler type internal combustion engines and has particular reference to an adjustable wabbler mechanism.

The use of an adjustable wabbler mechanism to obtain either variable compression ratio or constant compression ratio is known. The mechanisms heretofore proposed have serious limitations from a practical standpoint. The problems of dynamic balance, deflection of working parts, and provision of space for adequate bearings have not been heretofore adequately solved so as to make the proposals for adjustable wabbler mechanisms economically practical.

All of the elements of a wabbler mechanism are subject to heavy shock loads, of a reversing nature and high frequency, which tend to cause rapid fatigue and wear. The limited space available for bearings and structural members make the design problem particularly difficult. The aforementioned problems occur even more in an engine involving the use of a movable, pivoted wabbler hub which permits the wabble plate to move along, and change its angle relative to, the main shaft. Both such movements are necessary to accomplish constant compression ratio operation.

Due to the fact that the wabbler hub rotates within the star or wabbleplate, the direction and magnitude of the forces acting on the hub are continuously changing. This means that the pivot or trunnion bearings of the wabbler hub must be designed to resist external forces from any direction, and capable of operating with substantially zero clearance to avoid backlash. Also the structural members of the hub must be designed for extreme rigidity to resist these changing forces and prevent distortion from centrifugal forces. Furthermore, the entire mechanism must remain in static as well as dynamic balance with the wabbler in any operation position. None of the wabbler mechanism previously disclosed comes anywhere near meeting these rigid requirements.

It is the general object of the present invention to provide a wabbler mechanism which does not have the shortcomings of those heretofore proposed. In particular, it is an object of the invention to provide an improved wabbler mechanism in which the wabbler hub may move along and change its angle relative to the main shaft while, at the same time, problems of balance, structural strength, etc., are satisfactorily solved.

These and other objects of the invention particularly relating to details of construction and operation will become apparent from the following description read in conjunction with the accompanying drawings, in which.

Figures 1, 5:
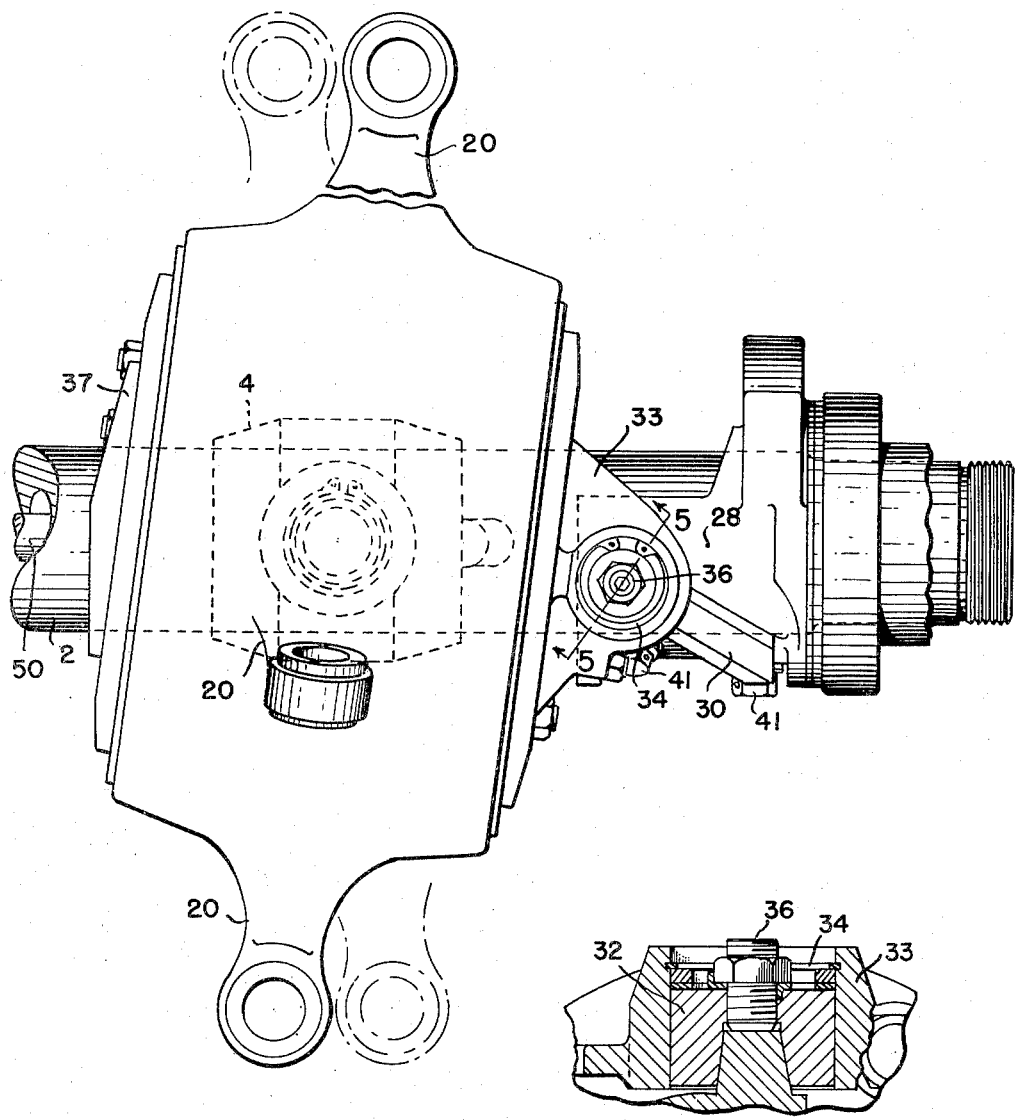
Figure 1 is a side elevation of the improved wabbler mechanism showing the position of the hub for minimum stroke of the pistons.
Figure 5 is a fragmentary section on the plane 5—5 of Figure 1.

The wabbler mechanism described and claimed herein is shown in the application of Samuel B. Eckert, Serial No. 722,876, filed January 18, 1947, now Patent No. 2,648,228, to which application reference may be made for discussions of the type of engine involving constant compression, the engine therein disclosed being of the opposed piston type. As will appear, the invention is applicable not only to opposed piston engines but also to engines of single-ended type, and is also applicable to engines which do not involve constant compression operation.

Referring to the drawings, there is indicated therein only so much of the mechanism of a wabbler type engine as is required for understanding of the present invention. The main shaft 2 has slidably mounted thereon the trunnion sleeve 4 which is formed with a pair of trunnions 6 serving to mount, between thrust washers 8 and 10, the wabbler hub 14. The outer thrust washers 10 are held against axial outward movement by retaining rings 12 fitted into grooves in the trunnions.

In accordance with the invention, the sleeve 4 is not restrained against rotational movement relative to the shaft by any interconnection directly between the sleeve and shaft.

Figure 4:
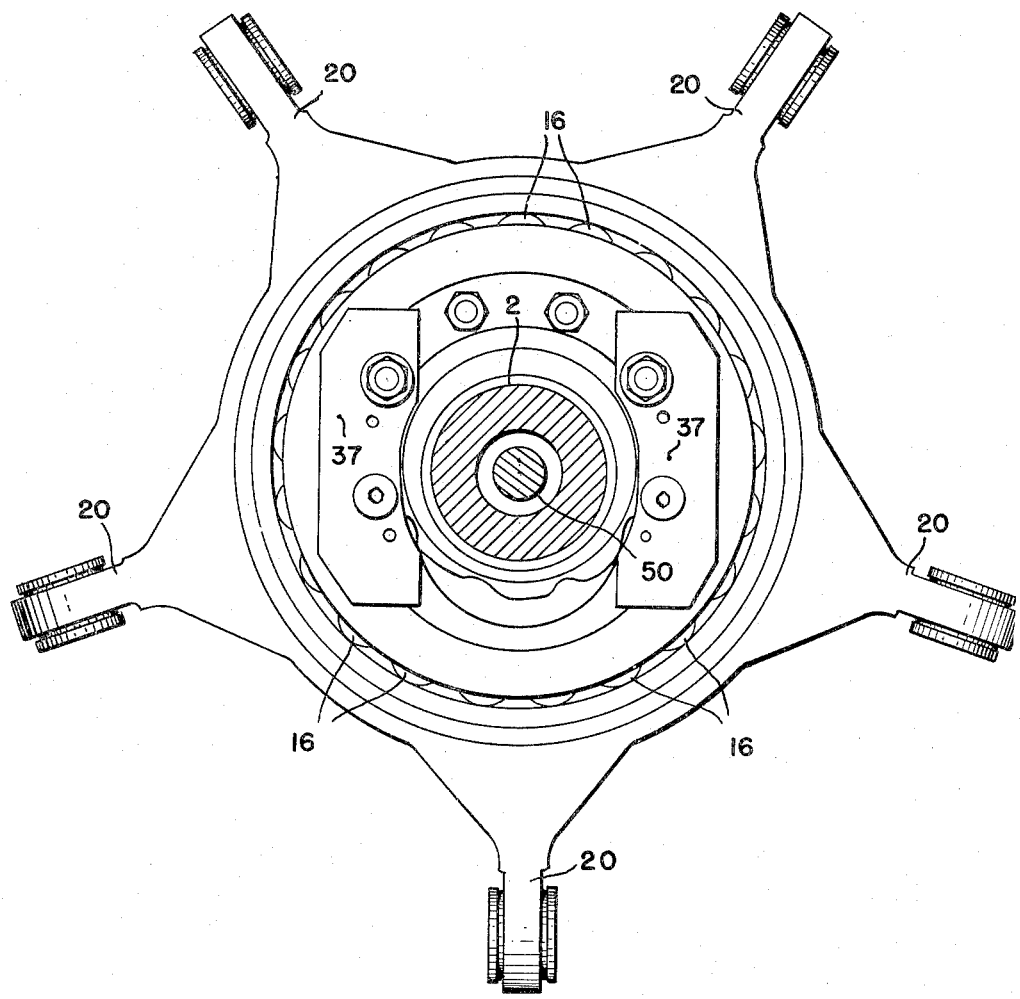
Figure 4 is an elevation of the starplate showing the main shaft in section, the elevation being viewed from the left of Figure 1.

The hub 14 supports through bearing 16 the star or wabbler plate 18 which is provided with a plurality of arms 20, shown in Figure 4 as five in number, which arms embrace wrist pins carried by slippers 22 which are free to slide and rotate in transverse cylindrical bores in the piston crossheads 24 connected to the piston heads 26. The arrangement thus provided is of the so-called "floating wabbler" type. Desirably, damping is provided between the starplate arms and the slippers in accordance with the disclosure of my application, Serial No. 332,598, filed January 22, 1953.

In accordance with the invention there is a guide member 28 keyed to shaft 2 and located axially thereon by means of collar 29 provided with shims 31, said guide member having a pair of guide rails 30, one on each side of the shaft 2. These guide rails have outwardly converging guide surfaces which are embraced by the similar converging surfaces of a pair of shoes 32 which are pivotally mounted in ears 33 formed on the hub 14, the common axis of the two shoes about which they rotate being parallel to the common axis of the trunnions 6. The shoes 32 are maintained in position in the bores in the ears 33 by means of retaining rings 34 and are provided with adjustable screws 36 arranged to bear upon the outer surfaces of the rails 30.

The shimmed collar 29 attached by screws to guide member 28, is clamped against a shoulder of shaft 2 by means of the ball bearing retaining nut 35, and serves as a means of adjusting the guide axially on the shaft to correct the angularity of the hub 14 during assembly of the mechanism. Once located axially on the shaft it is rigidly affixed thereto by means of screws 41 in slotted holes in the guide member.

To achieve static and dynamic balance of the hub 14 in view of the presence of the ears 33 and the shoes, counterweights 37 are secured to the opposite side of the hub.

In order to provide for adjustment of the sleeve 4 and its trunnions 6 lengthwise of the shaft 2, there are located within the trunnions kingpins 38 held in position by retaining rings and projecting through longitudinal slots 39 in the shaft 2. To maintain the sleeve 4 free of the shaft from the standpoint of relative rotary movement, the slots 39 have clearance with the pins 38. In other words, the pins 38 are not adapted to receive circumferential forces which would restrain rotary relative movements between the sleeve 4 and shaft 2.

The inner ends 40 of the pins 38 enter holes in a nut 42 which is internally threaded at 44 to receive the external threads on a member 46 which is arranged to be rotated for adjustment by an electric or hydraulic motor mechanism indicated in construction lines at 47. The member 46 is also internally threaded at 48 to engage the external threads of a rod 50 which, in the case of an opposed piston type of engine, serves for adjustment of another sleeve corresponding to 42 which serves to adjust a trunnion sleeve at the other end of the engine. To secure equal simultaneous inward or outward adjustment of the trunnion sleeves, the internal and external threads of the member 46 have equal pitch but are of opposite hands. While the movement of the trunnion sleeves is shown as being effected by means of a screw mechanism driven by a motor, the control rods, and accordingly the trunnion sleeves, could be actuated as well by means of a conventional hydraulic cylinder located in or attached to the end of shaft 2, and provided with suitable control valves. Lubrication is effected through connections to the interior of the shaft 2, and to prevent loss of lubricant through the slots 39 packing rings are provided at 52 and 54 respectively on the outside and inside of the nut 42. The threads of member 46 are lubricated by means of oil holes 56, 57 and 58 drilled in the end of rod 50. A metering pin 60 attached to plug 62 limits the lubricant flow.

From the foregoing description, it will be noted that constraint for simultaneous rotation of the hub 14 and the shaft 2 is imposed by engagement of the shoes 32 with the guide rails 30, together with the limitation of axial movement of the trunnion sleeve 4 by engagement of pins 38 with nut 42.

The hub, trunnion and guide members rotate with the shaft within the essentially non-rotating starplate. This starplate in normal operation has the usual wabbling motion accompanied by limited oscillation components relatively to and about the shaft. Essentially, however, it can be considered as not rotating. When the shaft is rotated, the axis of the hub being at an angle with the shaft, the starplate is caused to oscillate, thereby moving the pistons inwardly and outwardly of the cylinders. Inversely, the gas pressure forces, acting on the pistons, are transmitted to the starplate arms, and thence through the ball bearings to the hub. At other than dead center positions of the hub, components of these couple forces acting on the hub produce a torque reaction on the hub which is in turn transmitted to the shaft through the arms of the hub, the slotted shoes and the guide members 30. None of the hub torque reaction is taken by the trunnion bearings or trunnion pins. This arrangement produces a degree of flexibility in the hub thereby reducing shock and noise. Another advantage is that close alignment of the trunnion pin holes and shaft slots is eliminated and the shock is absorbed where better bearing materials can be provided, namely, at the shoes and guide. The direct piston thrust is absorbed at three points: where the trunnion pins engage the control rods, at the trunnion sleeve and shaft bearing, and at the guide rails, the thrust being primarily absorbed at the guide rails.

The gas pressure and inertia forces are highest when the hub is in the top dead center position. At this time the couple forces acting at the trunnion bearings and guide rail shoes are at right angles to the bearing surfaces, which is an ideal condition. As soon as the hub moves off dead center position the forces normal to the trunnion arm and rail shoe bearings diminish rapidly, until at 90° shaft rotation the couple forces at the trunnions are entirely absorbed by the internal and external thrust washers 8 and 10 on the trunnions. Also the couple force at the guide is now acting perpendicularly to the plane of each rail and is absorbed entirely by one shoe, on the tapered surfaces of the slot, and on the adjusting screw 36 which contacts the outer surface of the rail. By the time the shaft has rotated 180° to the bottom dead center position the couple forces on the trunnion and guide are again normal to their respective bearing surfaces, but this time on the opposite side of the arm and rail. In operation the top dead center peak load of one cylinder occurs very nearly at the same time as peak bottom center loads on the cylinders which flank the opposite end of a diameter of the starplate, so that the resultant forces on the trunnion and guide are greatly reduced. Provisions have, therefore, been made to handle forces acting on the hub from any direction.

Figure 2:
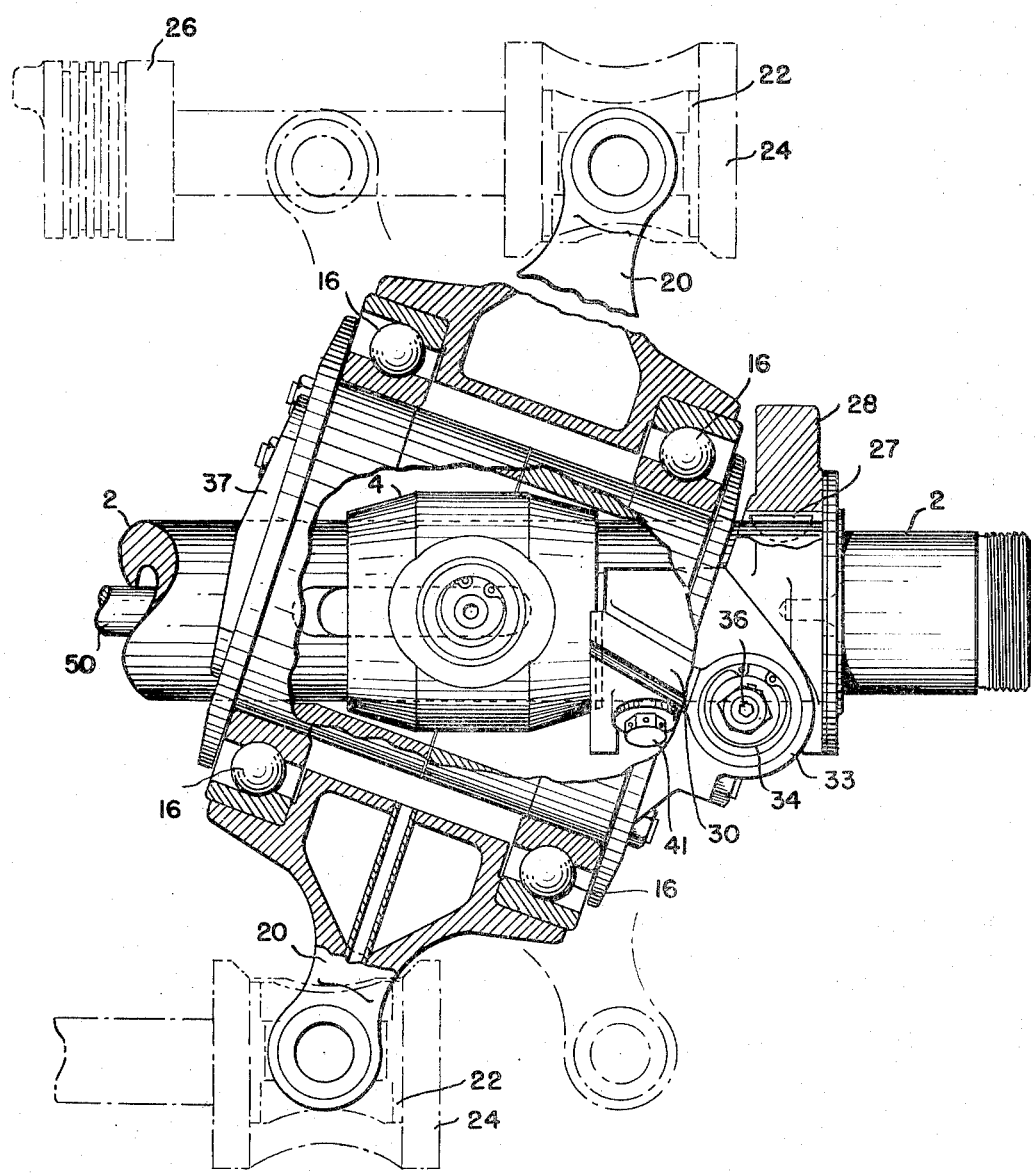
Figure 2 is a view similar to Figure 1 but partially in section and showing the improved wabbler mechanism adjusted for maximum stroke of the pistons.
Figure 3:
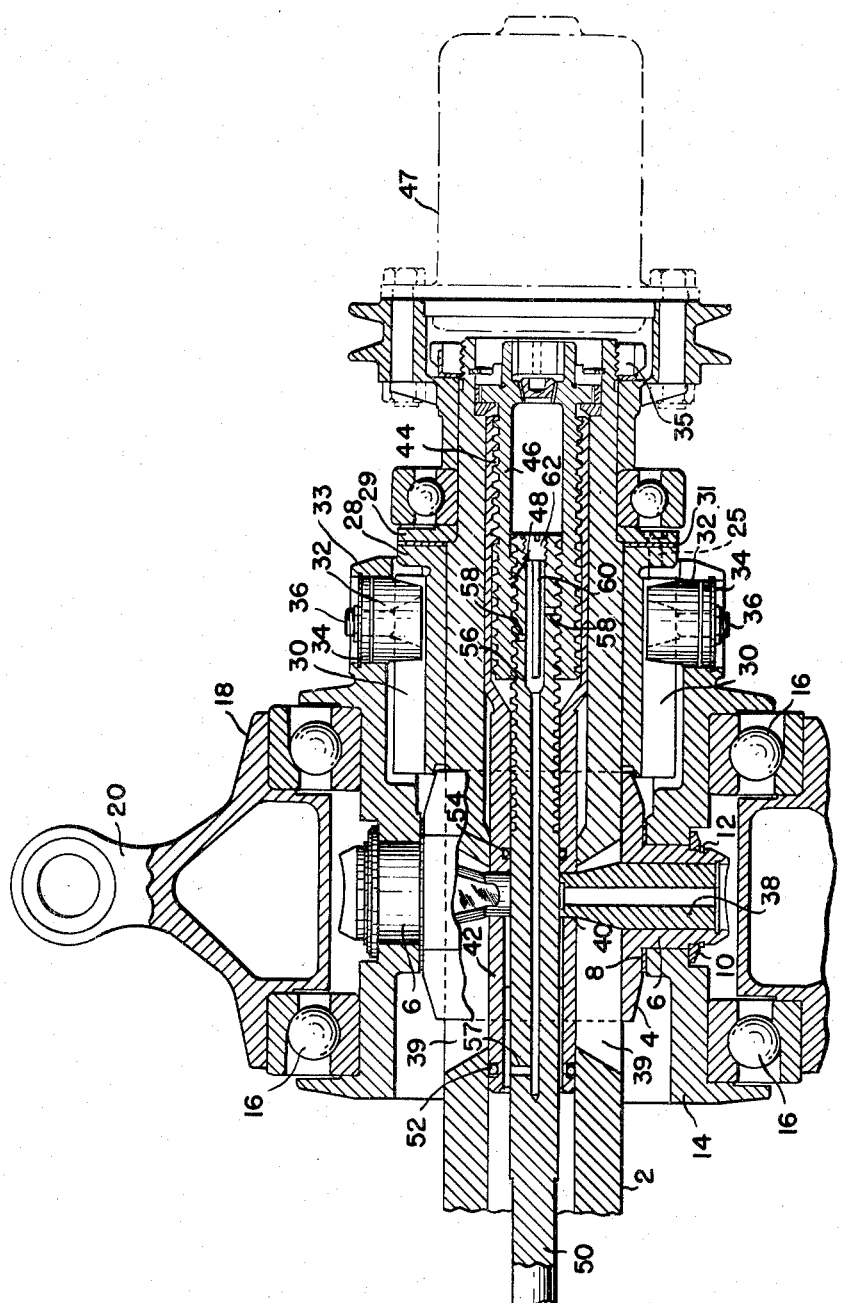
Figure 3 is a fragmentary axial section through the mechanism.

It will be noted that the foregoing occurs for any axial position of the hub and for any corresponding angular position relative to the shaft due to the sliding of the shoes on the diagonally directed guide rails. Figure 1 shows the position of minimum angularity of the hub involved when the trunnions occupy an extreme left-hand position as viewed in that figure with the shoes 32 engaging the inner portions of the guides 30. The position of maximum angularity is illustrated in Figure 2, the trunnions then being in an extreme right-hand position with the shoes engaging the outer portions of the guide rails.

It will be evident from the foregoing that adequate provision is made for the proper absorption of the rapidly varying forces involved, the arrangement being furthermore consistent with adequate bearing surfaces and static and dynamic balance of the parts.

What is claimed is:

1. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a star plate mounted on said hub member and having arms connected to said pistons, and interengaging elements connecting said hub member to said shaft to maintain the hub member against rotation relative to the shaft, said member providing trunnions being free for limited rotary movement relative to the shaft except by virtue of said interengaging elements.

2. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a star plate mounted on said hub member and having arms connected to said pistons, and interengaging elements connecting said hub member to said shaft to maintain the hub member against rotation relative to the shaft, said interengaging elements serving to change the angular position of the hub member relative to the shaft about said trunnions, and said member providing trunnions being free for limited rotary movement relative to the shaft except by virtue of said interengaging elements.

3. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, and interengaging elements connecting said hub member to said shaft to maintain the hub member against rotation relative to the shaft, said interengaging elements serving to change the angular position of the hub member relative to the shaft about said trunnions when said member providing trunnions is displaced axially of the shaft, and said member providing trunnions being free for limited rotary movement relative to the shaft except by virtue of said interengaging elements.

4. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, and interengaging elements connecting said hub member to said shaft to maintain the hub member against rotation relative to the shaft, said interengaging elements comprising a rail member disposed at an angle relatively to a radial plane and a shoe engaging said rail and serving to change the angular position of the hub member relative to the shaft about said trunnions when said member providing trunnions is displaced axially of the shaft, and said member providing trunnions being free for limited rotary movement relative to the shaft except by virtue of said interengaging elements.

5. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, and interengaging elements connecting said hub member to said shaft to maintain the hub member against rotation relative to the shaft, said interengaging elements comprising a rail member disposed at an angle relatively to a radial plane and a shoe engaging said rail and serving to change the angular position of the hub member relative to the shaft about said trunnions when said member providing trunnions is displaced axially of the shaft.

6. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, interengaging elements connecting said hub member to said shaft to maintain the hub member against rotation relative to the shaft, and means for adjusting said member providing trunnions along the axis of the shaft, said member providing trunnions being free for limited rotary movement relative to the shaft except by virtue of said interengaging elements.

7. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a star plate mounted on said hub member and having arms connected to said pistons, interengaging elements connecting said hub member to said shaft to maintain the hub member against rotation relative to the shaft, said interengaging elements serving to change the angular position of the hub member relative to the shaft about said trunnions when said member providing trunnions is displaced axially of the shaft, and means for adjusting said member providing trunnions along the axis of the shaft, said member providing trunnions being free for limited rotary movement relative to the shaft except by virtue of said interengaging elements.

8. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a star plate mounted on said hub member and having arms connected to said pistons, interengaging elements connecting said hub member to said shaft to maintain the hub member against rotation relative to the shaft, said interengaging elements comprising a rail member disposed at an acute angle relatively to a radial plane and a shoe engaging said rail and serving to change the angular position of the hub member relative to the shaft about said trunnions, and means for adjusting said member providing trunnions along the axis of the shaft.

9. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a star plate mounted on said hub member and having arms connected to said pistons, interengaging elements connecting said hub member to said shaft to maintain the hub member against rotation relative to the shaft, said interengaging elements comprising a rail member disposed at an acute angle relatively to a radial plane and a shoe engaging said rail and serving to change the angular position of the hub member relative to the shaft about said trunnions when said member providing trunnions is displaced axially of the shaft, and means for adjusting said member providing trunnions along the axis of the shaft.

10. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, interengaging elements connecting said hub member to said shaft to maintain the hub member against rotation relative to the shaft, said interengaging elements comprising a rail member disposed at an angle relatively to a radial plane and a shoe engaging said rail and serving to change the angular position of the hub member relative to the shaft about said trunnions, and means for adjusting the position of said rail member lengthwise of the shaft.

11. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, interengaging elements connecting said hub member to said shaft to maintain the hub member against rotation relative to the shaft, one of said interengaging elements being fixed to said shaft during operation of the engine but adjustable lengthwise of the shaft to provide variable setting thereof, said interengaging elements serving to change the angular position of the hub member relative to the shaft about said trunnions when said member providing trunnions is displaced axially of the shaft.

12. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, interengaging elements connecting said hub member to said shaft to maintain the hub member against rotation relative to the shaft, and means for adjusting said member providing trunnions along the axis of the shaft, the last mentioned means including removable kingpins mounted in said member providing trunnions.

13. In an engine of the wabbler type having a plurality of cylinders arranged about a main shaft with their axes parallel to the shaft axis and pistons reciprocating in the cylinders, a member providing trunnions having an axis perpendicular to the shaft axis, a hub member pivoted on said trunnions, a starplate mounted on said hub member and having arms connected to said pistons, interengaging elements connecting said hub member to said shaft to maintain the hub member against rotation relative to the shaft, and means for adjusting said member providing trunnions along the axis of the shaft, the last mentioned means including removable kingpins mounted in said member providing trunnions, and axially adjustable means within the shaft engaging said kingpins.

References Cited in the file of this patent

UNITED STATES PATENTS

| | | |
|---|---|---|
| 1,042,018 | Macomber | Oct. 22, 1912 |
| 1,346,672 | Patton | July 13, 1920 |
| 2,231,100 | Wahlmark | Feb. 11, 1941 |
| 2,532,254 | Bouchard | Nov. 28, 1950 |

FOREIGN PATENTS

| | | |
|---|---|---|
| 276,072 | Great Britain | Aug. 18, 1927 |